United States Patent [19]

Ampferer et al.

[11] Patent Number: 4,657,043
[45] Date of Patent: Apr. 14, 1987

[54] OIL PRESSURE REGULATING VALVE

[75] Inventors: Herbert Ampferer, Bietigheim-Bissingen; Robert Binder, Schwieberdingen, both of Fed. Rep. of Germany

[73] Assignee: Dr. Ing. H.c.F. Porsche Aktiengesellschaft, Fed. Rep. of Germany

[21] Appl. No.: 802,433

[22] Filed: Nov. 27, 1985

[30] Foreign Application Priority Data

Nov. 29, 1984 [DE] Fed. Rep. of Germany ....... 3443518

[51] Int. Cl.$^4$ ........................ F16K 15/02; F16K 17/04
[52] U.S. Cl. ............................... 137/543.19; 137/538; 137/540
[58] Field of Search ............ 137/538, 539, 540, 543.19

[56] References Cited

U.S. PATENT DOCUMENTS

| | | | |
|---|---|---|---|
| 955,043 | 4/1910 | Barr et al. | 137/540 X |
| 1,691,449 | 11/1928 | Sharp | 137/543.19 |
| 1,775,833 | 9/1930 | Schneider | 137/543.19 |
| 2,305,519 | 12/1942 | Dunmire | 137/538 |
| 2,796,075 | 6/1957 | Focht | 137/115 |
| 2,826,216 | 3/1958 | Thomas | 137/543.19 X |
| 3,105,517 | 10/1963 | Alfieri | 137/540 |
| 3,415,271 | 12/1968 | Maasburg et al. | 137/543.19 X |
| 4,091,839 | 5/1978 | Donner | 137/539 |

FOREIGN PATENT DOCUMENTS

| | | |
|---|---|---|
| 2456524 | 8/1976 | Fed. Rep. of Germany . |
| 1004240 | 9/1965 | United Kingdom . |
| 1063356 | 3/1967 | United Kingdom . |
| 2027853 | 2/1980 | United Kingdom . |
| 2114715 | 8/1983 | United Kingdom . |

Primary Examiner—Alan Cohan
Assistant Examiner—John A. Rivell
Attorney, Agent, or Firm—Barnes & Thornburg

[57] ABSTRACT

A pressure relief valve for a lubrication system of an internal combustion engine includes a valve body disposed within a generally cylindrical bore in a housing. The valve body is axially movable within the bore and is provided with a sealing surface on one end. A spring biases the sealing surface against a valve seat in the housing. A guide, which is preferably sleeve-shaped, is non-fixedly arranged within the bore for guiding the axial movement of the valve body and reducing the impact of manufacturing tolerance variations on valve operation. In a preferred embodiment, the sealing surface of the valve body is spherically shaped and the valve seat is conically shaped. A vent passage is provided in the sleeve-shaped guide to equalize pressures within the bore during operation of the valve.

10 Claims, 2 Drawing Figures

OIL PRESSURE REGULATING VALVE

BACKGROUND AND SUMMARY OF THE INVENTION

This invention relates to a pressure relief valve for regulating the oil pressure in a lubrication system of an internal-combustion engine. The valve has a basic cylindrical shape and is arranged in a bore of a housing. The valve includes an axially movable sealing part or valve body, with a sealing area or surface which is biased by a spring against a valve seat in the housing.

A known pressure lubrication system for an internal-combustion engine is shown in German Unexamined Patent Application No. E-OS 24 56 524 and includes a relief valve which is guided on a tube-type shaft and which has a conical sealing surface which is clamped against a corresponding valve seat by a spring.

This construction has the disadvantage that the usual process tolerances, especially between the valve stem guide and the valve seat, impair the function of the relief valve, in which case the elimination of such problems requires relatively large expenditures.

It is therefore an object of this invention to provide a pressure relief valve for the oil pressure of an internal-combustion engine lubrication system in such a way that tolerance variations which occur within the framework of conventional manufacturing processes do not detrimentally influence its proper functioning.

These and other objects are attained in a pressure relief valve according to the present invention which includes a housing, a valve body disposed within a bore in the housing, and a guide member which is non-fixedly arranged within the bore for guiding the movement of the valve body. The bore within the housing, the valve body, and the guide member are preferably cylindrical in shape. The valve body is axially movable within the bore and is provided with a sealing area or surface on one end thereof. A compression spring is provided for biasing the sealing surface of the valve body against a valve seat formed in the housing. In an especially preferred embodiment, the sealing surface of the valve body is spherically shaped, while the valve seat of the housing is conically shaped. This structure, in combination with the "floating" nature of the guide member, assures proper alignment and leak proof operation of the valve.

In the preferred embodiment shown in the drawings, the guide member is a cylindrical sleeve which is provided with a plurality of openings or passages in the vicinity of an outlet duct formed in the housing. The openings are preferably evenly distributed around the circumference of the guide sleeve. The outside diameter of the cylindrical sleeve is preferably reduced in the vicinity of the outlet duct.

In the preferred embodiment, a compression spring is provided for biasing the sealing surface of the valve body against the valve seat in the housing. The spring is positioned within a recess or bore in the valve body, and a corresponding recess in a threaded plug which secures the guide sleeve in the housing. The valve body and the guide member are preferably formed of materials which have similar coefficients of thermal expansion. A vent passage is provided in the cylindrically shaped guide sleeve to connect the spaces on either side of the sleeve wall with one another to equalized operational pressures within the bore.

The advantages that are mainly achieved by means of the invention are that, in the case of considerable but still permissible tolerances between the bore and the valve seat, the sealing part of the pressure relief valve still interacts with the valve seat in a leakproof manner due to the floating guide sleeve. In other words, the sealing part, via the sealing area and the valve seat, is aligned within the framework of the axial and radial play of the guide sleeve. This is effectively enhanced by the fact that the sealing area of the sealing part is spherically shaped, while the valve seat of the housing is conically shaped.

By means of the guide sleeve, it is also achieved that the sealing part is protected from manufacturing imperfections (e.g., burrs) at edges, such as those of the oil outlet duct, which are hard to remove and, in the case of a direct contact with moving valve bodies, can result in a blocking of the latter.

The arrangement of passage openings in the guide sleeve ensures a controlled flow of the lubricant into the outlet duct. The localized taper or constriction of the outside diameter of the guide sleeve, in the vicinity of the outlet duct, also serves this purpose.

The recesses in the sealing part and the plug contribute to the proper functioning of the compression spring. When the guide sleeve and the sealing part are formed of materials which have similar or identical coefficients of thermal expansion, both parts will interact well with one another when affected by temperature. This valve arrangement is also suited for installation in a light-metal housing having a coefficient of thermal expansion which is clearly different from that of the valve arrangement. The resulting differences in thermal expansion have no influence on the mobility of the sealing part. Also, the sealing part, the guide sleeve, the compression spring and the closing plug are components that are easy to manufacture and simple to mount.

Finally, by means of a vent passage, it is achieved that during the operation of the sealing part the compressible medium within the guide sleeve can escape into the bore in the housing.

The invention is explained in the drawings by means of an example and will be described in detail in the following.

DETAILED DESCRIPTION OF THE DRAWINGS

Figure 1:
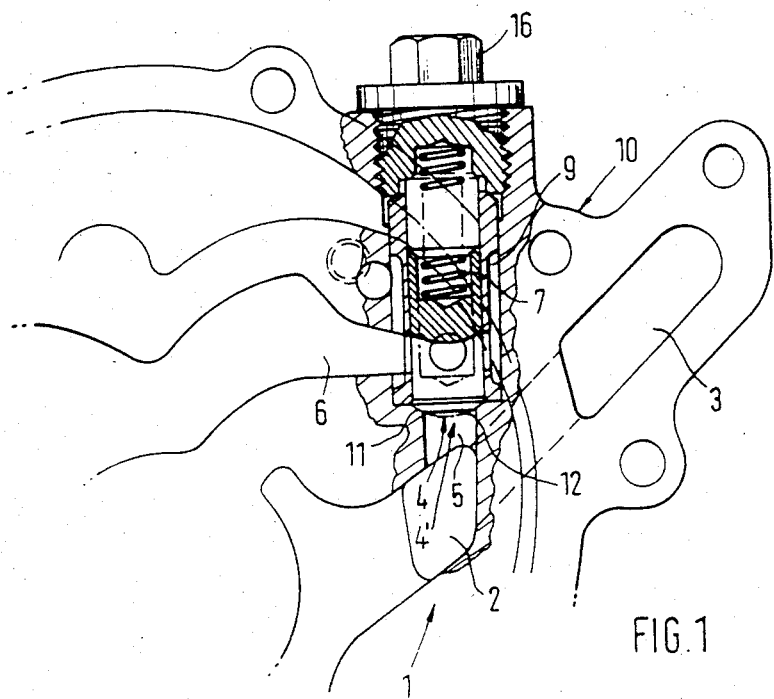
FIG. 1 shows a longitudinal cross section through a pressure relief valve constructed in accordance with the present invention.

An internal-combustion engine that is not shown in detail includes a lubrication system 1 in which oil under pressure flows from a first duct 2 into a second duct 3. In order to avoid excess pressure in lubrication system 1, a pressure relief valve 4' having a valve body or sealing part 4 is arranged on the outlet side of duct 2. Sealing part 4, via a branch bore 5, can be acted upon by the oil. When the sealing part 4 is opened, the lubricating medium flows, via an outlet duct, back into an oil sump that is not shown.

The sealing part 4 is preferably a cylindrical body having a circular cross-section which is biased by a spring 7, in an axially movable manner, and is arranged in a guide sleeve 8. The guide sleeve 8 is positioned in a bore 9 of a housing 10 and has a basic circular cylindrical shape.

Figure 2:
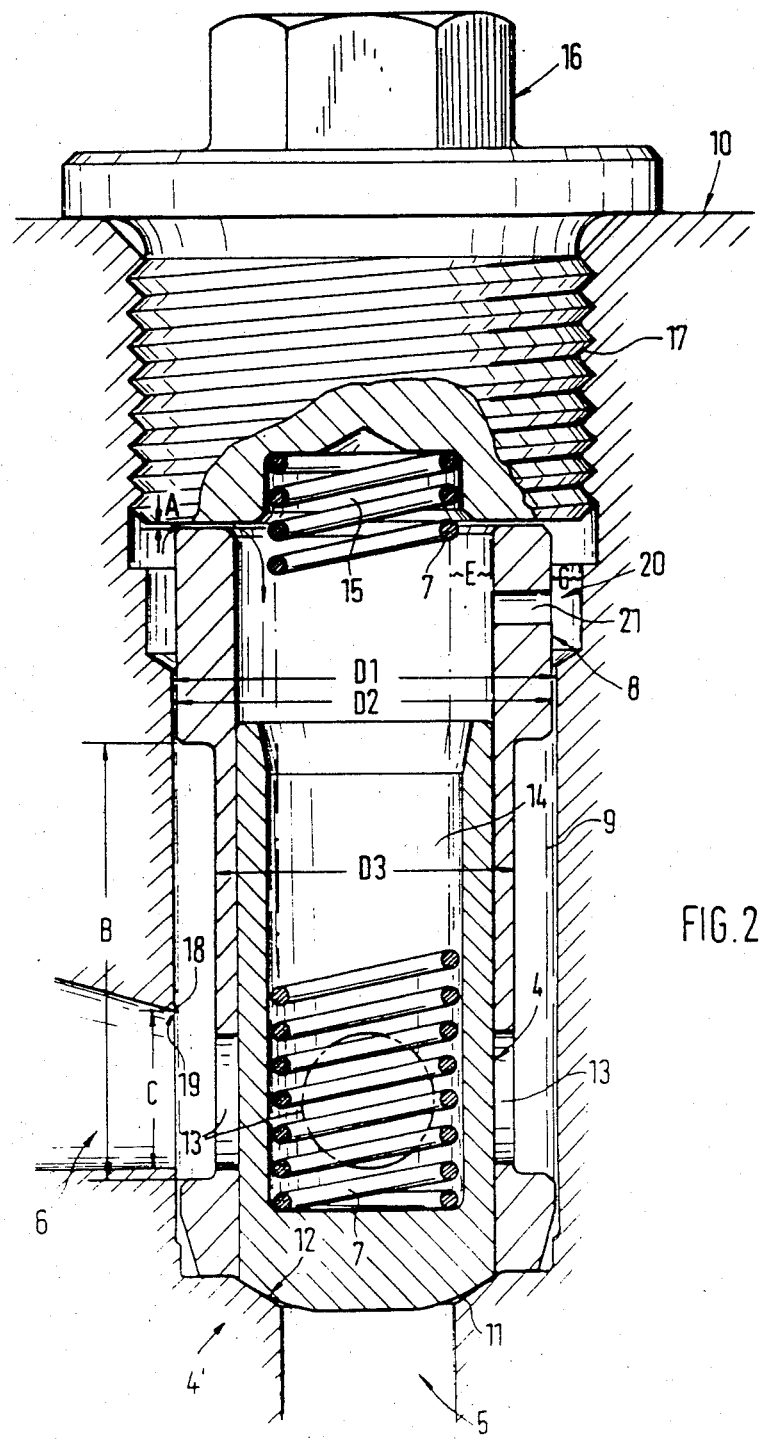
FIG. 2 shows an enlarged view of a portion of FIG. 1.

To prevent interference with the leakproof interaction of a sealing area or surface 12 of sealing part 4 by tolerance variations between bore 9 and a valve seat 11 of housing 10, guide sleeve 8 is designed to float, i.e., it is dimensioned so as to be radially and axially movable to a certain degree. This is illustrated by dimension lines D1, D2 and A (FIG. 2).

This type of sealing part, which aligns itself according to the condition of the tolerances, is effective when used with a flat fit, i.e., the sealing area of the valve body and the valve seat in the housing are planar.

However, in the embodiment shown, sealing area 12 is formed to be spherical in shape and valve seat 11 is formed to be conical so that, in the case of any permissible tolerance conditions, a good sealing effect is ensured.

Guide sleeve 8, in the area of outlet duct 6, has several circular outlet openings 13 which are evenly distributed around the circumference of the sleeve. In addition, guide sleeve 8 has a cross-sectional tapering or constriction, which is illustrated by dimension line D3 and which extends over the height B, and thus includes the diameter or width C of outlet duct 6.

On the side that is opposite sealing area 12, sealing part 4 has a recess or bore 14 that is used for receiving spring 7 which is formed as a compression spring. Another recess 15 for spring 7 is provided in a plug 16 which is threaded into housing 10 by means of threads 17 and which secures guide sleeve 8 in the axial direction.

Sealing part 4 and guide sleeve 8 are formed of materials which have at least a similar coefficient of thermal expansion. In the embodiment shown, both are made of steel. However, other possible materials are gray cast iron or a combination of steel and gray cast iron. In the case of this selection of material for sealing part 4 and guide sleeve 8, the housing may be formed of a light-metal material. The different coefficients of thermal expansion of housing 10, on the one hand, and sealing part 4 and guide sleeve 8, on the other hand, do not have a disadvantageous effect on the operation of sealing part 4 due to the floating nature of the guide sleeve.

Manufacturing imperfections 18 (burrs) at the edges 19 of outlet duct 6 which face bore 9 also have no effect on the axial mobility of sealing part 4 because the edges are separated from the bore by means of guide sleeve 8.

Finally, guide sleeve 8 is provided, at area 20 adjacent to plug 16, with a vent passage 21 by means of which the pressures in space E (recess 14) and space G (bore 9) resulting from compression of the medium during the operation of the sealing part are equalized.

From the preceding description of the preferred embodiments, it is evident that the objects of the invention are attained, and although the invention has been described and illustrated in detail, it is to be clearly understood that the same is by way of illustration and example only, and is not to be taken by way of limitation. The spirit and scope of the invention are to be limited only by the terms of the appended claims.

What is claimed is:

1. A pressure relief valve for a lubrication system of an internal-combustion engine, comprising:
    a housing having a generally cylindrical bore therein and having a tapered surface formed within the bore to define a valve seat on the housing;
    a valve body disposed within the bore, said valve body being axially movable within the bore and having a sealing surface thereon;
    spring means for biasing the sealing surface of the valve body against the valve seat on the housing; and
    guide means, non-fixedly arranged within the bore and disposed between said housing and said valve body, for guiding the axial movement of said valve body and for allowing the sealing surface of the valve body to sealingly mate with the valve seat in the presence of tolerances which would otherwise prevent mating of the sealing surface and valve seat on the housing when the valve is closed.

2. A pressure relief valve according to claim 1, wherein the sealing surface of the valve body is spherically shaped and the valve seat of the housing is conically shaped.

3. A pressure relief valve according to claim 1, wherein the guide means has a plurality of openings in the vicinity of an outlet duct of the housing.

4. A pressure relief valve according to claim 3, wherein the openings are evenly distributed around the circumference of the guide means.

5. A pressure relief valve according to claim 3, wherein the guide means is a generally cylindrical sleeve-shaped element and has a reduced outside diameter at least in the vicinity of the outlet duct.

6. A pressure relief valve according to claim 1, wherein the valve body has a recess for receiving the spring means and wherein said spring means is a compression spring.

7. A pressure relief valve according to claim 6, wherein a corresponding recess is provided in a plug which axially secures the guide sleeve and which is threaded into the housing.

8. A pressure relief valve according to claim 6, wherein the guide means has a vent passage connecting at least two spaces with one another to equalize operational pressure within the bore.

9. A pressure relief valve according to claim 1, wherein the guide means and the valve body are formed of materials having similar coefficients of thermal expansion.

10. A pressure relief valve according to claim 1, wherein the guide means has a vent passage connecting at least two spaces with one another to equalize operational pressures within the bore.

* * * * *